United States Patent
Henras et al.

(10) Patent No.: US 8,767,904 B2
(45) Date of Patent: Jul. 1, 2014

(54) METHOD OF OPERATING A PRESSURIZED-WATER NUCLEAR REACTOR FOR REACHING A PLUTONIUM EQUILIBRIUM CYCLE

(75) Inventors: Dorothee Henras, Le Chesney (FR); Song Hui Zheng, Chassieu (FR)

(73) Assignee: AREVA NP, Courbevioe (FR)

( * ) Notice: Subject to any disclaimer, the term of this patent is extended or adjusted under 35 U.S.C. 154(b) by 318 days.

(21) Appl. No.: 13/389,243

(22) PCT Filed: Jul. 21, 2010

(86) PCT No.: PCT/FR2010/051538
§ 371 (c)(1),
(2), (4) Date: Mar. 9, 2012

(87) PCT Pub. No.: WO2011/015756
PCT Pub. Date: Feb. 10, 2011

(65) Prior Publication Data
US 2012/0163525 A1    Jun. 28, 2012

(30) Foreign Application Priority Data

Aug. 6, 2009 (FR) ..................... 09 55529
Aug. 6, 2009 (FR) ..................... 09 55530

(51) Int. Cl.
*G21C 3/328* (2006.01)
*G21C 5/02* (2006.01)
*G21C 5/18* (2006.01)
*G21C 19/02* (2006.01)
*G21C 3/00* (2006.01)
*G21C 5/00* (2006.01)
*G21C 19/00* (2006.01)

(52) U.S. Cl.
USPC ......................................... 376/267

(58) Field of Classification Search
CPC ............ G21C 3/30; G21C 3/32; G21C 3/326; G21C 3/328; G21C 3/42; G21C 3/62; G21C 3/623; G21C 5/02; G21C 5/18; G21C 5/20; G21C 5/22; G21C 7/06; G21C 7/08; G21C 7/10; G21C 7/117
USPC ......... 376/156, 158, 170–173, 260, 261, 264, 376/267, 409, 412, 419, 426, 434, 435
See application file for complete search history.

(56) References Cited

U.S. PATENT DOCUMENTS 3,432,389 A * 3/1969 Stern .............................. 376/267
3,844,886 A * 10/1974 Crowther ...................... 376/267

(Continued)

FOREIGN PATENT DOCUMENTS

FR    2 693 023    12/1993
FR    2 864 322    6/2005

OTHER PUBLICATIONS

Barbrault P: "A plutonium-fueled high-moderated pressurized water reactor for the next century" Nuclear Science and Engineering, Academic Press, New York, NY, US, vol. 122, Feb. 1, 1996, pp. 240-246, XP009130876 ISSN: 0029-5639.

(Continued)

*Primary Examiner* — Bernarr Gregory
(74) *Attorney, Agent, or Firm* — Davidson, Davidson & Kappel, LLC

(57) ABSTRACT

A method is provided for operating a nuclear reactor. The method includes operating the nuclear reactor for an initial cycle during which a core contains initial nuclear fuel assemblies; then operating the nuclear reactor for transition cycles, at least some of the initial nuclear fuel assemblies being progressively replaced, during the replacement steps preceding the transition cycles, with transition nuclear fuel assemblies or with plutonium-equilibrium nuclear fuel assemblies; and then operating the nuclear reactor for at least one plutonium equilibrium cycle during which the core contains only plutonium-equilibrium nuclear fuel assemblies.

17 Claims, 15 Drawing Sheets

(56) References Cited

U.S. PATENT DOCUMENTS

| | | | | |
|---|---|---|---|---|
| 4,096,033 A | * | 6/1978 | Barry | 376/435 |
| 4,251,321 A | * | 2/1981 | Crowther | 376/435 |
| 4,326,919 A | * | 4/1982 | Hill | 376/267 |
| 4,678,619 A | * | 7/1987 | Radkowsky | 376/173 |
| 4,851,181 A | * | 7/1989 | Takeda et al. | 376/267 |
| 4,968,476 A | * | 11/1990 | Radkowsky | 376/172 |
| 5,089,210 A | * | 2/1992 | Reese et al. | 376/267 |
| 5,416,813 A | | 5/1995 | Hiraiwa et al. | |
| 5,440,598 A | * | 8/1995 | Reese et al. | 376/435 |
| 5,822,388 A | | 10/1998 | Kantrowitz et al. | |
| 6,233,302 B1 | | 5/2001 | Kantrowitz et al. | |
| 2007/0242792 A1 | | 10/2007 | Blaudin De The | |

OTHER PUBLICATIONS

Vasile A et al: "Advanced fuels for plutonium management in pressurized water reactors" Journal of Nuclear Materials, Elsevier BV, NL LNKD-DOI:10.1016/S0022-3115(03)00148-X, vol. 319, Jun. 1, 2003, pp. 173-179, XP004429003 ISSN: 0022-3115.

Aniel-Buchheit S et al: "Plutonium recycling in a full-MOX 900-MW(electric) PWR: physical analysis of accident behaviors" Nuclear Technology, American Nuclear Society, Chicago, IL, US, vol. 128, No. 2, Nov. 1, 1999, pp. 245-256, XP009130860 ISSN: 0029-5450.

Hyung-Kook Joe et al: "Feasibility study on the utilization of mixed oxide fuel in Korean 900 MWe PWR core through conceptual core nuclear design and analysis" Journal of the Korean Nuclear Society, Korean Nuclear Society, Seoul, KR, vol. 29, No. 4, Aug. 1, 1997, pp. 299-309, XP009139954 ISSN: 0372-7327.

Fetterman et al: "AP1000 core design with 50% MOX loading" Annals of Nuclear Energy, Pergamon Press, Oxford, GB LNKD-DOI:10.1016/J.ANUCENE.2008.11.022, vol. 36, No. 3, Apr. 1, 2009, pp. 324-330, XP026004615 ISSN: 0306-4549 [extrait le Jan. 4, 2009].

* cited by examiner

METHOD OF OPERATING A PRESSURIZED-WATER NUCLEAR REACTOR FOR REACHING A PLUTONIUM EQUILIBRIUM CYCLE

The present invention relates to a method for operating a nuclear reactor.

BACKGROUND

The reprocessing of spent nuclear fuel assemblies has made large amounts of plutonium available.

Using this plutonium in order to mix it with uranium and thereby form nuclear fuels has been suggested for a long time. These fuels, which contain, before irradiation, a mixture of uranium and plutonium oxides are generally called MOX (Mixed Oxide) fuels.

The assemblies containing such MOX fuels, called MOX assemblies in the following, have been loaded into the cores of nuclear reactors where they coexist with assemblies, the nuclear fuel of which before irradiation does not contain any plutonium oxide but only uranium oxide. Such assemblies will be called $UO_2$ assemblies in the following, and the fuel which they contain $UO_2$ fuel. A nuclear reactor core loaded with assemblies of MOX fuel and with assemblies of $UO_2$ fuel will be called a mixed core in the following.

The isotopes of plutonium and those of uranium have very different neutron properties and in particular differences in cross section.

Considering that these differences in neutron properties made it impossible to purely and simply substitute $UO_2$ fuel with MOX fuel in order to produce MOX assemblies, document FR-2 693 023 described a zoned MOX assembly, i.e. for which the nuclear fuel rods have a same plutonium isotope composition (or vector), i.e. the same composition in terms of percentages of the respective mass fractions of each isotope making up the plutonium, and nominal total plutonium mass contents different from one zone to the other of the assembly.

Thus, the nominal total plutonium mass content is lower on the faces than at the centre of the assembly, and even lower in the corners of the assembly. With this, it is possible to obtain a radial distribution of the linear power density in the core of the nuclear reactor, in particular in the peripheral rods of the MOX assemblies adjacent to $UO_2$ assemblies, which is acceptable.

Moreover, as recalled in this document, the plutonium stemming from reprocessing has an isotope composition which strongly varies in particular depending on the initial uranium 235 enrichment, on the burn-up rate and on the storage duration of the fuel before reprocessing.

In order to compensate for the neutron behavior differences which such differences in isotope compositions might induce, energy equivalence relationships were established in order to determine the nominal total plutonium mass contents for different isotope compositions corresponding to a reference uranium 235 content. With these equivalent nominal total mass contents it is possible to compensate for the differences in isotope compositions and to reach the same burn-up rates in the same type of fuel management. The equivalence relationships use equivalence coefficients which depend on the isotope composition of the relevant MOX fuel, i.e. on the isotope composition of the plutonium and the uranium 235 content of the uranium associated with the plutonium.

These equivalence relationships are for example mentioned in pages 41 to 43 of the document entitled Status and Advances in MOX Fuel Technology, Technical Reports Series No. 415 and published by the International Atomic Energy Agency in 2003.

As an example, the table below specifies in its first portion the typical compositions of the plutonium stemming from the reprocessing of $UO_2$ fuel assemblies for a pressurized water reactor as a function of the initial uranium 235 enrichment of the fuel and of the burn-up rate attained by the fuel, the storage duration before reprocessing being the same for all the examples mentioned in the table.

The table specifies in its second portion (last line) the nominal total plutonium mass contents with which it is possible to attain the same burn-up rate as a $UO_2$ assembly enriched to 3.70% by mass of uranium 235 and therefore to compensate for the decrease in the quality of the plutonium: reduction in the amount of fissile isotopes (plutonium 239 and plutonium 241) and increase in the amount of absorbent fertile isotopes (plutonium 238, plutonium 240, plutonium 242 and americium 241).

|  |  | $UO_2$ assembly for a pressurized water reactor | | | |
| --- | --- | --- | --- | --- | --- |
| Origin of the Pu used | | Enriched to 3.25% by mass of $^{235}U$ and irradiated at 30 GWd/tHM | Enriched to 3.70% by mass of $^{235}U$ and irradiated at 40 GWd/tHM | Enriched to 4.00% by mass of $^{235}U$ and irradiated at 50 GWd/tHM | Enriched to 4.95% by mass of $^{235}U$ and irradiated at 70 GWd/tHM |
| Isotope composition (% by mass) | 238Pu | 1.2 | 2.1 | 3.1 | 5.3 |
| | 239Pu | 62.2 | 57.7 | 53.6 | 48.9 |
| | 240Pu | 23.0 | 24.1 | 24.9 | 24.9 |
| | 241Pu | 8.0 | 8.7 | 9.1 | 9.3 |
| | 242Pu | 4.4 | 6.1 | 7.9 | 10.2 |
| | 241Am | 1.2 | 1.3 | 1.4 | 1.4 |
| Nominal total Pu mass content (%) equivalent to an enrichment to 3.70% by mass of $^{235}U$ | | 6.7 | 7.6 | 8.7 | 10.7 |

Taking into account the more and more substantial available amounts of plutonium, certain producers of electricity have desired that the newly built nuclear reactors may be loaded with up to 50% of MOX assemblies.

Document U.S. Pat. No. 6,233,302 describes a nuclear reactor in which all the nuclear fuel assemblies loaded into the core contain MOX fuel. In order to ensure a homogeneous radial distribution of the linear power density, these assemblies always have a zoned configuration and further comprise nuclear fuel rods which do not contain any plutonium oxide and for which the nuclear fuel in addition to the inevitable impurities resulting from the manufacturing, contains consumable neutron poisons such as erbium oxide.

However, this reactor does not allow optimum use of the plutonium and these assemblies are complex and costly to produce.

SUMMARY OF THE INVENTION

An object of the invention is to provide a method for operating a pressurized water nuclear reactor, the method being useful in order to be able to use more plutonium with increased efficiency and more reduced costs.

A method is provided for operating a pressurized water nuclear reactor comprising a core containing nuclear fuel assemblies comprising nuclear fuel rods the method comprising steps consisting of operating the nuclear reactor for successive cycles with, between each cycle, steps for replacing spent nuclear fuel assemblies with fresh nuclear fuel assemblies, a method wherein:

the reactor is operated for an initial cycle during which the core contains initial nuclear fuel assemblies at least some of the initial nuclear fuel assemblies only comprising nuclear fuel rods which, before irradiation, contain uranium oxide but do not contain any plutonium oxide, and then the reactor is operated for transition cycles, at least some of the initial nuclear fuel assemblies being progressively replaced, during the replacement steps preceding the transition cycles, with transition nuclear fuel assemblies or with plutonium-equilibrium nuclear fuel assemblies, the plutonium-equilibrium nuclear fuel assemblies only comprising, before irradiation, nuclear fuel rods exclusively based on uranium and plutonium mixed oxide, and for each plutonium-equilibrium nuclear fuel assembly, the nuclear fuel rods have a same nuclear fuel isotope composition and a same nominal total plutonium mass content, and then the nuclear reactor is operated for at least one plutonium-equilibrium cycle during which the core only contains plutonium-equilibrium nuclear fuel assemblies.

According to particular embodiments, the method may comprise one or more of the following features, taken individually or according to all technically possible combinations:

at least some of the transition nuclear fuel assemblies comprise poisoned nuclear fuel rods, the poisoned nuclear fuel rods containing before irradiation at least one consumable neutron poison;

at least some of the poisoned nuclear fuel rods do not contain, before irradiation, any plutonium;

the nuclear fuel rods of at least some of the initial nuclear fuel assemblies have, before irradiation, nominal plutonium fissile isotope contents less than those of the nuclear fuel rods of the plutonium equilibrium nuclear fuel assemblies;

at least some of the transition nuclear fuel assemblies comprise nuclear fuel rods which, before irradiation contain uranium oxide but do not contain any plutonium oxide;

at least during the replacement step preceding a transition cycle or the plutonium equilibrium cycle, transition nuclear fuel assemblies are replaced with plutonium equilibrium nuclear fuel assemblies;

at least some initial nuclear fuel assemblies are zoned nuclear fuel assemblies, the nuclear fuel rods of which contain, before irradiation, uranium and plutonium mixed oxide, these zoned nuclear fuel assemblies each comprising several zones in which the nuclear fuel rods have, before irradiation, different nominal plutonium isotope contents.

at least some of the zoned nuclear fuel assemblies each include a first central zone comprising nuclear fuel rods having a first nominal plutonium fissile isotope content, a second zone extending along outer faces of the zoned nuclear fuel assembly and consisting of nuclear fuel rods having a second nominal plutonium fissile isotope content strictly less than the first nominal plutonium fissile isotope content, and optionally a third zone positioned in corners of the zoned nuclear fuel assembly and consisting of nuclear fuel rods having a third nominal plutonium fissile isotope content strictly less than the second nominal plutonium fissile isotope content, during the initial cycle, the zoned nuclear fuel assemblies are located in the outer peripheral layer of the core;

during the replacement step preceding a first transition cycle, transition nuclear fuel assemblies are loaded into the layer immediately adjacent to the outer peripheral layer of the core.

transition nuclear fuel assemblies loaded during the replacement step preceding a first transition cycle comprise nuclear fuel rods which, before irradiation contain uranium oxide but do not contain any plutonium oxide;

during the replacement step preceding the first transition cycle, the zoned nuclear fuel assemblies are displaced immediately inside the layer located immediately inside the outer peripheral layer of the core;

during the replacement steps preceding the first transition cycle, a second transition cycle, a third transition cycle and the equilibrium cycle, plutonium equilibrium nuclear fuel assemblies are loaded;

in the initial cycle, all the nuclear fuel rods of the initial nuclear fuel assemblies, before irradiation, contain uranium oxide but do not contain any plutonium oxide;

in the plutonium equilibrium cycle, the nuclear fuel rods of all the plutonium equilibrium nuclear fuel assemblies have a same nuclear fuel isotope composition and a same nominal total plutonium mass content.

BRIEF SUMMARY OF THE DRAWINGS

The invention will be better understood upon reading the description which follows, only given as an example and made with reference to the appended drawings wherein.

DETAILED DESCRIPTION

Figure 1:
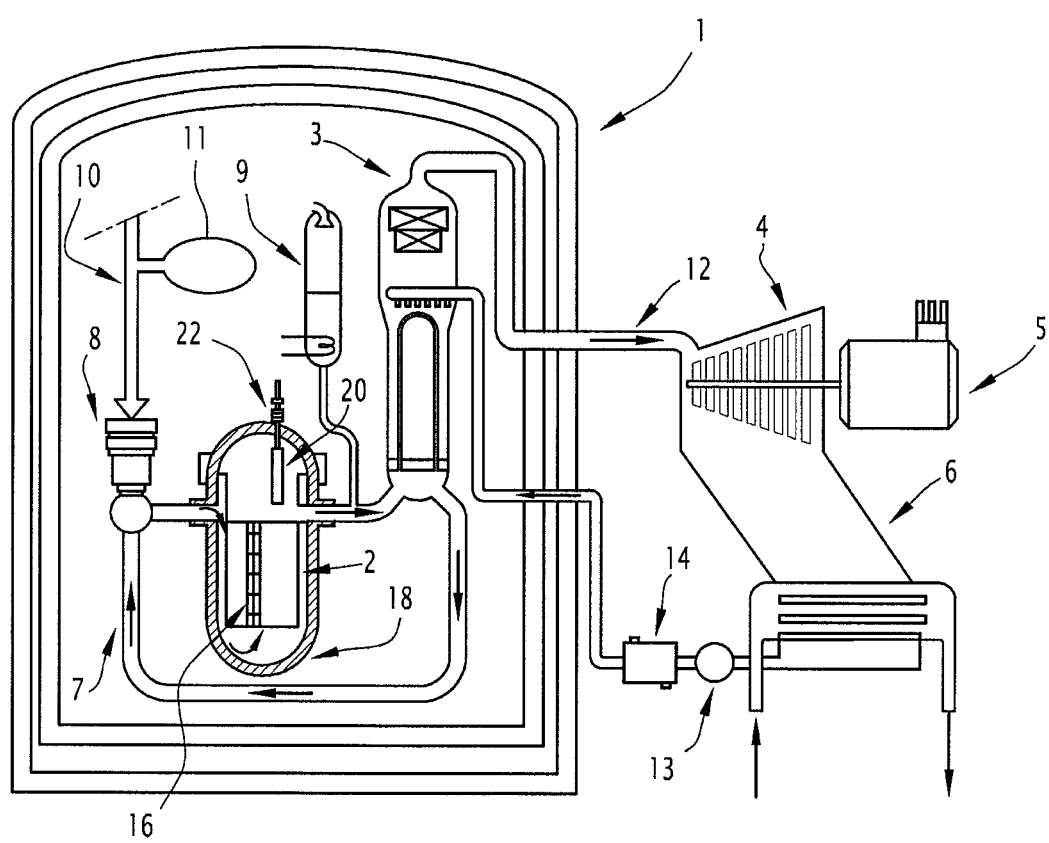
FIG. 1 is a schematic view illustrating a pressurized water nuclear reactor.

FIG. 1 schematically illustrates a pressurized water nuclear reactor 1 which conventionally comprises a core 2, and one or more of each of the elements below, only one of each of these elements being illustrated in FIG. 1:
a steam generator 3,
a turbine 4 coupled with an electric power generator 5 and a condenser 6.

The nuclear reactor 1 comprises a heavy reflector. The nuclear reactor 1 further comprises a primary circuit 7 equipped with pumps 8 and in which pressurized water flows along the path materialized by the arrows in FIG. 1. This water in particular flows upward through the core 2 in order to be heated therein while ensuring cooling and moderation in the core 2.

The primary circuit 7 further comprises a pressurizer 9 with which the pressure of the water flowing in the primary circuit 7 may be regulated.

A circuit 10, a so-called water makeup network or further WMN is connected to the primary circuit 7, for example via the pump 8, in order to supply water to the primary circuit 7. The circuit 10 for example comprises reservoirs 11 containing soluble boron, for example in the form of boric acid $H_3BO_3$. The WMN circuit 10 thus allows introduction of the boron into the water of the primary circuit 7 and therefore a decrease in the reactivity in the core 2. Preferably, the boron contained in the reservoir 11 is enriched with boron 10, for example so that its atomic content of this isotope is greater than 40% and is for example of about 50%. It is recalled that the isotope 10 atomic content of natural boron is about 20%.

The water of the primary circuit 7 also feeds the steam generator 3 where it is cooled by ensuring vaporization of water flowing in a secondary circuit 12.

The steam produced by the steam generator 3 is channeled through the secondary circuit 12 towards the turbine 4 and then towards the condenser 6 where this steam is condensed by indirect heat exchange with the water coolant flowing in the condenser 6.

The secondary circuit 12 comprises downstream from the condenser 6, a pump 13 and a heater 14.

Also conventionally, the core 2 comprises nuclear fuel assemblies 16 which are loaded in a vessel 18. A single assembly 16 is illustrated in FIG. 1, but the core 2 for example comprises 241 assemblies 16.

Figure 2:
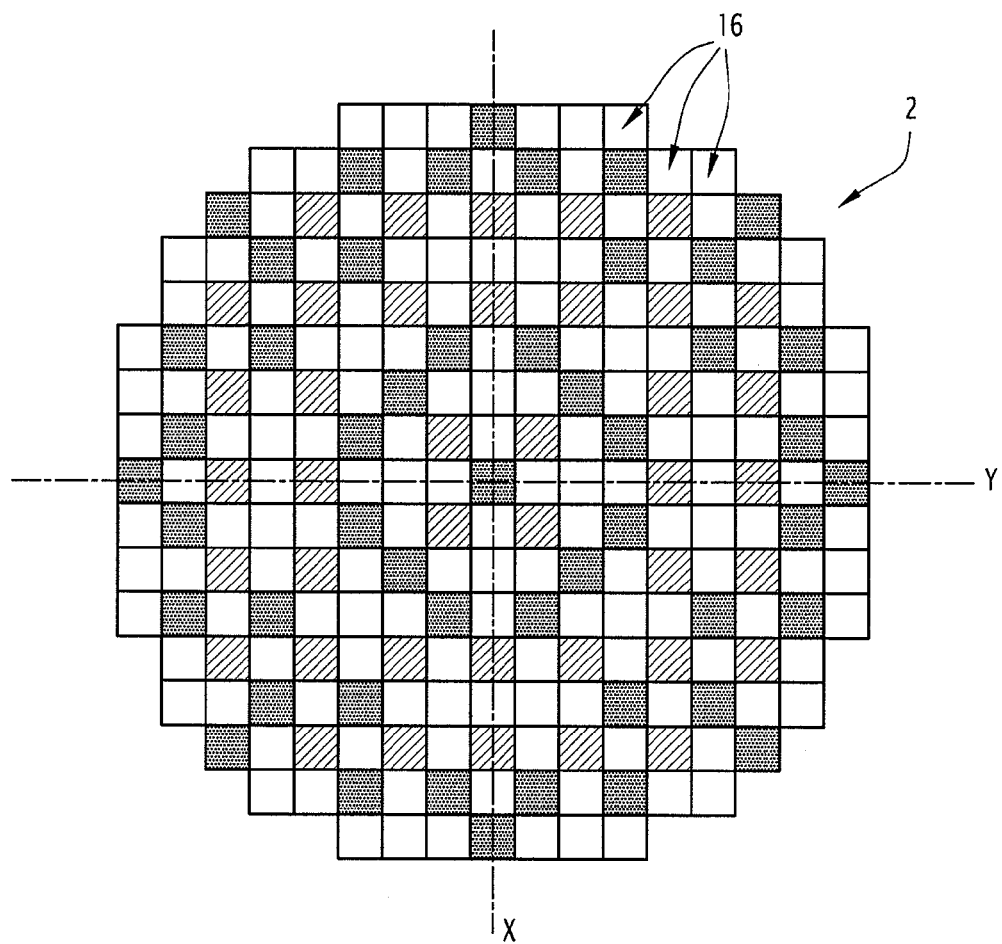
FIG. 2 is a schematic top view showing a possible distribution of the nuclear fuel assemblies and control clusters within the core of the nuclear reactor of FIG. 1.

FIG. 2 shows a top view of an example of distribution of these different assemblies 16 within the core 2. Each square materializes an assembly 16.

Conventionally, during the operation of the reactor 1, the latter operates during successive cycles which are separated by steps for replacement during which the spent assemblies 16 are replaced with fresh assemblies 16 and the assemblies 16 remaining in the core 2 may change position.

The reactor 1 comprises control clusters 20 (FIG. 1) which are arranged in the vessel 18 above certain assemblies 16. A single cluster 20 is illustrated in FIG. 1, but the core 2 may for example comprise 89 clusters 20.

The clusters 20 may be moved by mechanisms 22 so as to be inserted into the assemblies 16 which they overhang, or be extracted therefrom.

Conventionally, each control cluster 20 comprises absorbent rods which include one or more materials absorbing neutrons and optionally inert rods, i.e. which do not have any specific capability of absorbing neutrons.

Thus, by the vertical displacement of the clusters 20 it is possible to adjust the reactivity in the core 2 and it allows variations in the overall power P provided by the core 2 from zero power up to the nominal power NP, depending on the depth of introduction of the control clusters 20 in the assemblies 16.

Some of these control clusters 20 are intended to ensure the regulation of the operation of the core 2, for example in power or in temperature and are called regulating clusters. Other ones are only intended for stopping the reactor 1 and are called stopping clusters. In the illustrated example, the nuclear reactor 1 comprises 40 regulating clusters and 49 stopping clusters. The assemblies 16 surmounted with a regulating cluster are located by hatchings and those surmounted with a stopping cluster by dots in FIG. 2.

Figure 3:
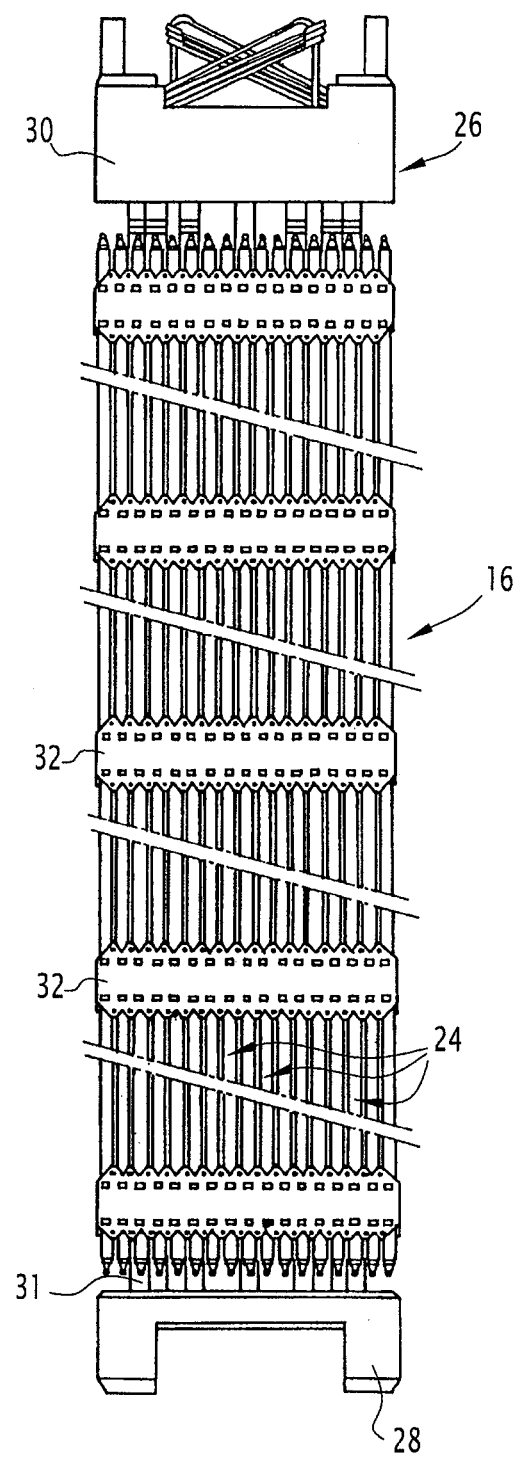
FIG. 3 is a lateral schematic view of a nuclear fuel assembly of the core of the nuclear reactor of FIG. 1.
Figure 4:
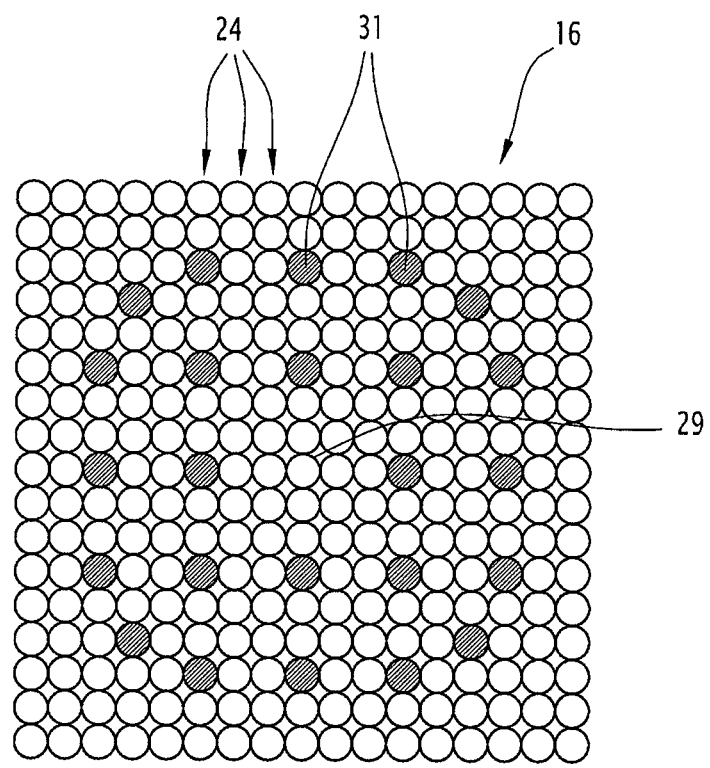
FIG. 4 is a schematic top view illustrating a possible distribution of the nuclear fuel rods in the assembly of FIG. 3.

As illustrated by FIGS. 3 and 4, each assembly 16 conventionally comprises a bundle of nuclear fuel rods 24 and a frame 26 for supporting the rods 24.

The frame 26 conventionally comprises a lower end piece 28, an upper end piece 30, guide tubes 31 connecting both end pieces 30 and 28 and intended to receive rods of the control clusters 20, and spacer grids 32.

FIG. 4 shows the distribution of the nuclear fuel rods 24 in an assembly 16 according to the described example. The nuclear fuel rods 24 and the guide tubes 31 form therein a network with a square base with a side of 17 rods. The assembly 16 thus comprises for example 24 guide tubes 31 and 265 nuclear fuel rods 24. The nodes of the network are preferably each occupied by a nuclear fuel rod 24, by a guide tube 31, and optionally by an instrumentation tube 29 which replaces a nuclear fuel rod 24 at the center of the assembly 16. Thus, all the nodes of the network are occupied by a nuclear fuel rod 24, an instrumentation tube 29 or a guide tube 31 and the assemblies 16 therefore do not include any water hole in their network.

As the assembly 16 is intended for a pressurized water reactor, it does not comprise any outer casing surrounding the nuclear fuel rods 24, like the assemblies 16 for a boiling water reactor where this casing channels the moderation water and steam. In such an assembly 16 for a pressurized water reactor, the zone with the strongest moderation is not located between two adjacent assemblies but around the guide tubes.

Figure 5:
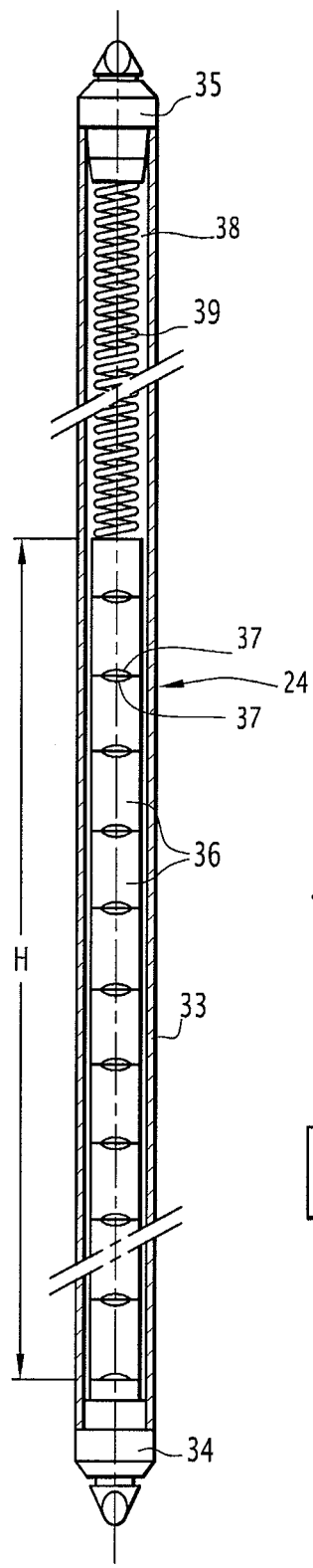
FIG. 5 is a schematic longitudinal sectional view of a fuel rod of the assembly of FIG. 3.

As illustrated in FIG. 5, each nuclear fuel rod 24 conventionally comprises a cladding 33 in the form of a circular tube closed by a lower plug 34 and an upper plug 35. The rod 24 contains the nuclear fuel formed for example in the form of a series of pellets 36 stacked in the cladding 33 and bearing against the lower plug 34. A holding spring 39 is positioned in the upper segment of the cladding 33 in order to bear upon the upper plug 35 and upon the upper pellet 36.

The pellets 36 may include recesses 37 in the form of spherical caps. Preferably, these pellets 36 are nevertheless solid and therefore do not for example include any through-passage giving them an annular shape.

Conventionally, the cladding 33 is in a zirconium alloy.

According to a preferred operation mode of the reactor of FIG. 1, the nuclear fuel used in all the rods 24 of the assemblies 16 is a same MOX fuel.

The reactor 1 then operates according to successive cycles called plutonium-equilibrium cycles in the following and the assemblies 16 used during such a cycle will be called plutonium-equilibrium assemblies 16.

For a same isotope composition, all the rods 24 have a same nominal total Pu mass content. Thus, except for the differences necessarily resulting from the manufacturing, all the rods 24 have exactly the same total Pu mass content. This total mass content is defined as being the ratio between the total mass (Pu+Am) in the nuclear fuel and the total mass of the heavy isotopes (U+Pu+Am), in percent. Conventionally, this total mass content is presently less than a threshold content of 13% and for example equal to about 7% or 10%. For a given isotope composition, the uncertainties resulting from the manufacturing may lead to relative differences in the contents D varying in a range of + or −5%, the relative difference D being defined by:

$$D(\%) = \frac{(\text{actual content} - \text{nominal content})}{\text{nominal content}}$$

Preferably, no rod 24 contains any consumable neutron poison, such as rare earth oxides for example, except for the inevitable impurities resulting from the manufacturing.

A space 38 for expansion of the gases produced during the irradiation of the nuclear fuel is delimited inside the cladding 33 by the nuclear fuel, the lower plug 34, the upper plug 35 and the spring 39.

The expansion spaces 38 preferably have volumes V which are adjusted in order to take into account the greater release of fission gases during irradiation of the MOX fuel as compared with a $UO_2$ fuel which would be irradiated under the same conditions.

Moreover, specific steps may be taken in order to increase the volume of the expansion spaces 38 such as by the use of shims or the presence of lower plugs 34 with a specific shape as described in FR-2 864 322.

The core 2 preferably has a nominal linear power density NPlin of less than 175 W/cm and still preferably less than 170 W/cm.

The nominal linear power density is defined by:

$$NPlin = \frac{NP}{N*H}$$

wherein NP is the nominal power of the core 2, N is the number of nuclear fuel rods 24 present in the core 2 and H is the height of nuclear fuel (further called fissile column height), i.e. the height of the stack of pellets 36 (see FIG. 5).

Figure 6:
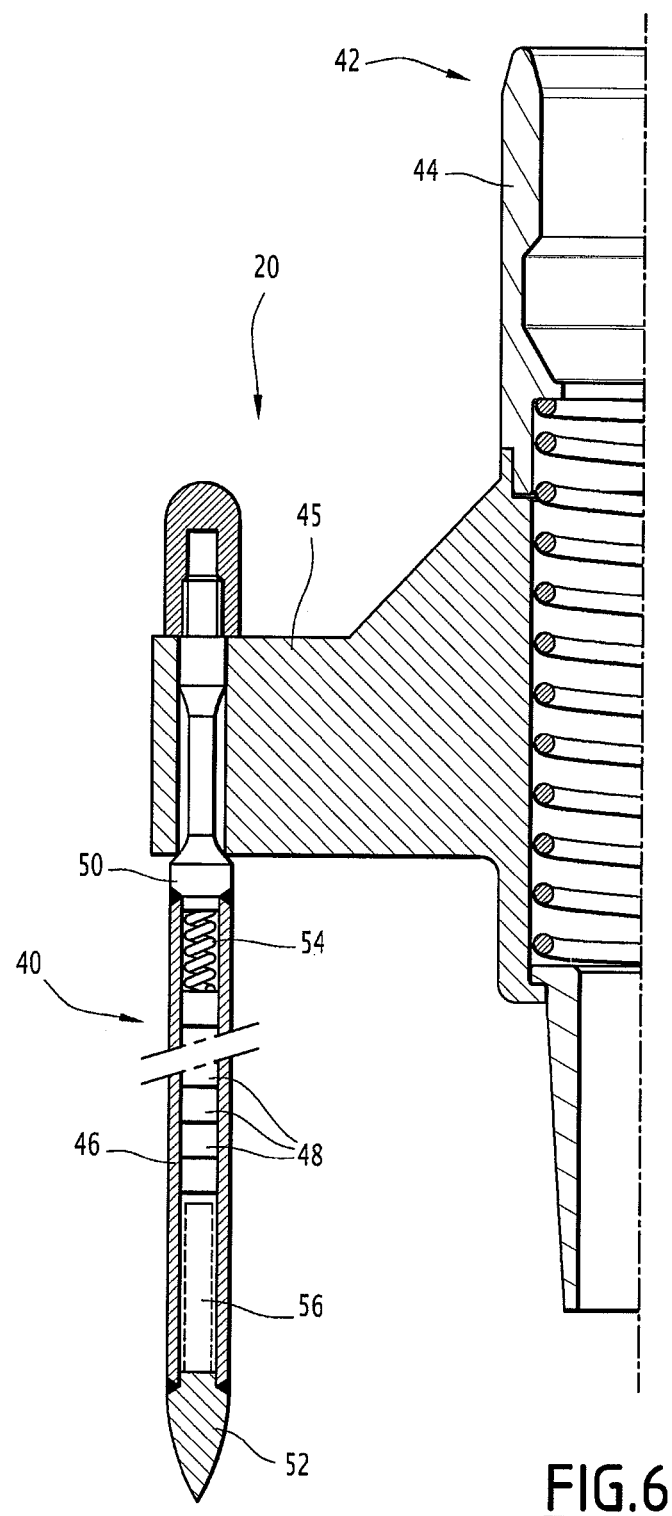
FIG. 6 is a schematic partial longitudinal sectional view of a control cluster of the nuclear reactor of FIG. 1.

FIG. 6 illustrates the structure of a control cluster 20. This control cluster 20 includes absorbent rods 40 and a spider 42 ensuring the supporting and holding of the absorbent rods 40 in the form of a bundle in which the absorbent rods 40 are parallel with each other and laterally positioned according to the same network as that of the guide tubes 31 of the corresponding assembly 16.

The spider 42 for example includes a knob 44 with which the control cluster 20 may be connected to the corresponding displacement mechanism 22 and fins 45 firmly attached to the knob 44 on each of which one or more absorbent rods 40 are attached.

The absorbent rod 40 illustrated in FIG. 6 includes a tube 46 containing a stack of pellets 48 in boron carbide $B_4C$. The tube 46 is closed at its upper end with a plug 50 and at its lower end with a dome-shaped plug 52. The tube 46 and the plugs 50 and 52 are for example made in steel and were optionally subject to a treatment against wear such as nitridation, oxidation.

The stack of pellets 48 in $B_4C$ is held inside the tube 46 by a spring or any other blocking device 54. In the illustrated example, the lower end of the column of pellets 48 bears upon the lower plug 52 via a spacer 56. The spacer 56 may for example be made in a silver-indium-cadmium (SIC) alloy. The upper 50 and lower 52 plugs were welded to the tube 46, for example with laser beam, electron beam, TIG, friction or resistance welding.

In a preferred alternative, the boron contained in the pellets 48 is enriched with boron 10, for example at an atomic content of more than 30%, still preferably more than 40% and for example 50%.

Figure 7:
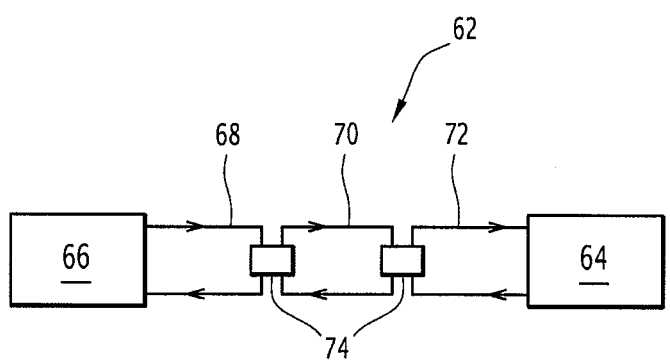
FIG. 7 is a diagram illustrating a cooling facility of the nuclear reactor of FIG. 1, when the core is shut down.

In a preferred alternative, the reactor 1 comprises an auxiliary cooling facility 62 illustrated by FIG. 7. This auxiliary facility 62 is in particular used for cooling the core 2 when it is shut down, for cooling pools for laying or storing the fuel . . . . With the cooling facility 62 it is possible to thermally connect the elements 64 of the reactor 1, a single one of which is illustrated in FIG. 7, to a cold source 66. The element 64 may for example be the pool of a fuel building, a pump, a heat barrier. The cold source 66 may for example be formed by a stream of water or the sea or a dry air coolant.

The element 64 and the cold source 66 are thermally connected in the example illustrated by an outer circuit 68 which for example is the so-called backup raw water circuit or further BWC, an intermediate circuit 70 which for example is the so-called intermediate cooling circuit or ICC and an inner circuit 72, the circuits 68, 70 and 72 are put into a thermal relationship with each other through heat exchangers 74 which preferably are plate exchangers.

During a plutonium-equilibrium cycle mentioned earlier, the core 2 is loaded with 100% of MOX fuel, so that the amount of plutonium consumed by the core 2 is greater than that consumed by the reactors of the prior state of the art.

The use of a single total plutonium mass content gives the possibility when it is compared with zoned MOX assemblies according to the state of the art, of loading more plutonium into the core 2 and/or guaranteeing an additional margin relatively to the allowed threshold content.

Because of the homogeneous plutonium content within the core 2 and of the slow decrease in the reactivity of the MOX fuel depending on the irradiation, the radial dispersion of the linear power density around the average value is low and the power is therefore actually radially homogeneous within the core 2. A larger stability of the axial distribution of the power in the core 2 is also noted due to the lower efficiency of the xenon in a 100% MOX environment.

By the low nominal linear power density NPlin, the reactor gives the possibility of having increased safety margins which may be used for increasing the flexibility of the management of the core 2 as well as of having margins on the pressure inside the rods 24 thereby allowing higher burn-up rates and longer irradiation cycle durations. This allows a further increase in the performances of the MOX fuel used and allows them to be brought to the level of those of $UO_2$ fuel in a 100% $UO_2$ core.

Thus, the burn-up rate for the assemblies 16 of the core 2 described above may attain 50 GWd/tHM (GigaWatt.day per ton of Heavy Metal) or even 60 GWd/tHM and more. These performances may be obtained while controlling the internal pressure in the rods by adjusting the volumes V of the expansion spaces 38 in order to take into account the characteristics of the MOX fuel, present alone in the core 2, without it being necessary to take into account the characteristics of another fuel like in the state of the art.

It should be noted that this low linear power density goes against the present trend of increasing this power.

The absence of water rods in the plutonium-equilibrium assemblies 16 also gives the possibility of having a structure totally similar to that of $UO_2$ assemblies, which further allows reduction in the costs associated with the core 2 by greater standardization. This absence of water rods further allows low nominal linear power density to be retained and therefore increased safety margins to be retained.

The use of a single total plutonium mass content also gives the possibility of reducing the costs by a greater standardization and the absence of neutron poisons avoids specific and costly manufacturing and reprocessing steps as well as perturbation of the power shape of the reactor due to progressive depletion of these neutron poisons during irradiation.

In certain alternatives, the nominal total plutonium mass content and/or the isotope compositions of the nuclear fuel may vary between the assemblies 16 present in the core 2 during a same plutonium-equilibrium cycle.

In these alternatives, these different contents are not necessarily equivalent to each other and the isotope composition of the fuel of the relevant assemblies 16 may even be identical.

By boron 10 enrichment of the boron contained in the control clusters 20 and of the soluble boron introduced into the primary circuit 7, the stopping margins and the safety criteria may be more easily observed in spite of the specific neutron behavior of the MOX fuel, in particular its neutron spectrum. The total boron concentration in the primary circuit 7 thus remains acceptable with regard to the specifications of the chemistry of the primary circuit and there is no risk of crystallization.

The use of plate exchangers 74 in the auxiliary cooling facility 62 further allows if necessary compensation for the larger residual heat from the MOX fuel.

Thus, the core 2 has increased operating and safety margins in normal and accidental situations in the operation of the reactor 1 and allows consumption of more plutonium with increased efficiency.

In order to attain better performances, it is appropriate to use a low nominal linear power density of the core, as well as not to have any water hole in the plutonium-equilibrium assemblies, not to have any neutron poison in the nuclear fuel rods used, to use enriched boron in the control clusters 20 and in the boron supply circuits of the primary circuit 7, to have expansion spaces 38 with an optimized volume and to use, if necessary plate exchangers 74 as described above.

However, in certain alternatives, all these features or either one or the other may be absent. As an example, rather than a boron 10 enrichment of the $B_4C$ contained in the clusters, it is possible to use for example a larger number of control clusters 20 or to keep the number of control clusters 20 and change their distribution between regulating clusters and stopping clusters.

Also, the assemblies 16 may have structures and/or features different from those described above and in particular comprise a different number of nuclear fuel rods 24.

The control clusters 20 described earlier may also be used in reactors for which the cores are loaded conventionally, i.e. with conventional MOX assemblies and/or with $UO_2$ assemblies.

The reactor 1 described above may start with a core 2, 100% loaded with MOX assemblies.

This being said, economically, it seems to be more advantageous to start the reactor 1 with a core 2 partly or even 100% loaded with $UO_2$ assemblies and to then pass during a subsequent cycle to a core 2, 100% loaded with MOX assemblies.

Thus, and only as an example, the steps of an operating method for starting the reactor 1 with a core 2 partly loaded with $UO_2$ assemblies and reaching a plutonium-equilibrium cycle, are described with reference to FIGS. 8 to 12.

This method for operating the reactor 1 thus comprises an initial cycle and several transition cycles with which it is possible to reach a plutonium-equilibrium cycle which may be followed by any number of such plutonium-equilibrium cycles.

FIGS. 8 to 12 respectively illustrate the configurations of the core 2 corresponding to the initial cycle, to the transition cycles, three in the described example, and to the plutonium-equilibrium cycle. Between each cycle, the method comprises steps for replacing spent nuclear fuel assemblies with fresh nuclear fuel assemblies. Because of the symmetry of the core 2 relatively to horizontal axes X and Y, only a quarter of the structure of the core 2 has been illustrated in FIGS. 8 to 13.

As an example, in the initial cycle, the core 2 is loaded with so-called initial nuclear fuel assemblies which may for example be distributed in four categories:

initial nuclear fuel assemblies 16A, these assemblies being $UO_2$ assemblies which contain uranium enriched for example to 2.1% by mass of uranium 235, the number of assemblies 16A being for example 97, initial nuclear fuel assemblies 16B, these assemblies being $UO_2$ assemblies which contain uranium enriched to a value by mass greater than that of the assemblies 16A, for example to 3.2% of uranium 235, the number of assemblies 16B being for example 72, initial nuclear fuel assemblies 16C, these assemblies being $UO_2$ assemblies which contain uranium enriched to a value by mass greater than that of the assemblies 16B, for example to 4.2% of uranium 235, the number of assemblies 16C being for example 32, and initial nuclear fuel assemblies 16D which are MOX assemblies, the number of assemblies 16D being for example 40.

The nuclear fuel rods 24 of the assemblies 16A to 16C therefore before irradiation do not contain any plutonium. Some of the initial nuclear fuel assemblies 16A to 16C may comprise nuclear fuel rods 24 containing before irradiation a consumable neutron poison, such as gadolinium oxide.

Figure 13:
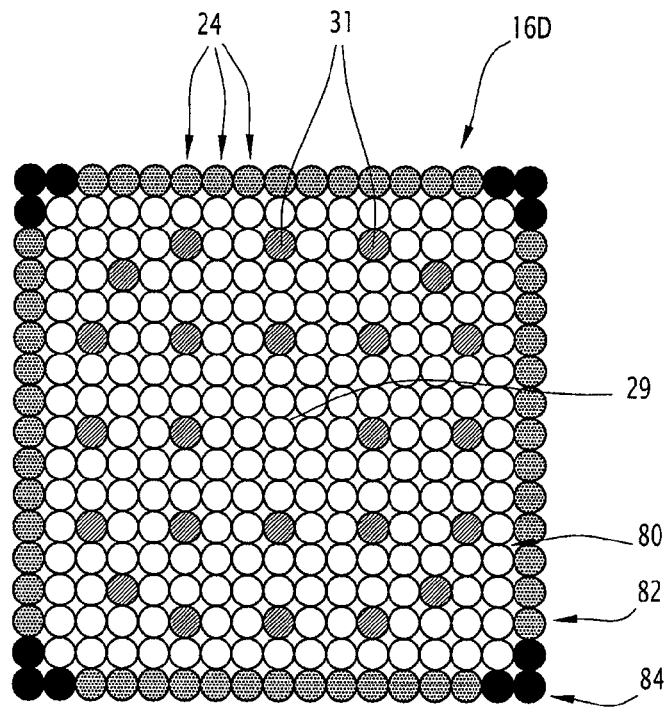
FIG. 13 is a similar view to FIG. 4 illustrating an initial nuclear fuel assembly which may be used upon starting the core of the reactor of FIG. 1 in order to reach a plutonium-equilibrium cycle.

The structure of the initial assemblies 16D is illustrated by FIG. 13.

This structure is zoned so that the MOX nuclear fuel used varies between different zones of the assembly 16D. In order to distinguish these different MOX nuclear fuels, in the following of the description, the plutonium fissile isotope content t which is defined as the ratio in % between the total mass of fissile isotopes (Pu239 and Pu241) and the total mass of heavy isotopes (U+Pu+Am). The reactivity of a MOX fuel assembly depends on the content t and on the isotope composition of the plutonium used. Other parameters such as for example the total plutonium mass content may be used.

In the described example, the plutonium used has the same isotope composition and the assembly 16D comprises:

a first central zone 80 consisting of nuclear fuel rods 24 having a first nominal fissile isotope content t1, for example of 4.6% which corresponds to a nominal total plutonium mass content of 6.3% in the example considered, and a second zone 82 extending along the outer faces of the nuclear fuel assembly 16D and consisting of nuclear fuel rods 24 having a second nominal fissile isotope content t2 strictly less than the first content t1, the content t2 for example having the value of 3.4% which corresponds to a nominal total plutonium mass content of 4.6% in the example considered, a third zone 84 positioned at the corners of the nuclear fuel assembly 16D and consisting of nuclear fuel rods 24 having a third nominal fissile isotope content t3 strictly less than the second content t2, the content t3 for example having the value of 2% which corresponds to a nominal total plutonium mass content of 2.7% in the example considered.

In the described example, the third zone 84 comprises 12 rods 24.

In an alternative not shown, the assembly 16D may only comprise two zones, one corresponding to the zone 80 described earlier and the second to the union of the zones 82 and 84 described earlier where, in this alternative, the rods 24 are identical.

The nominal average plutonium mass content of the assemblies 16D in the considered example is 5.7%. More generally it is substantially larger than the uranium 235 enrichment of the nuclear fuel assemblies 16C, which is 4.2% in the example described, in order to obtain the energy equivalence.

Figure 8:
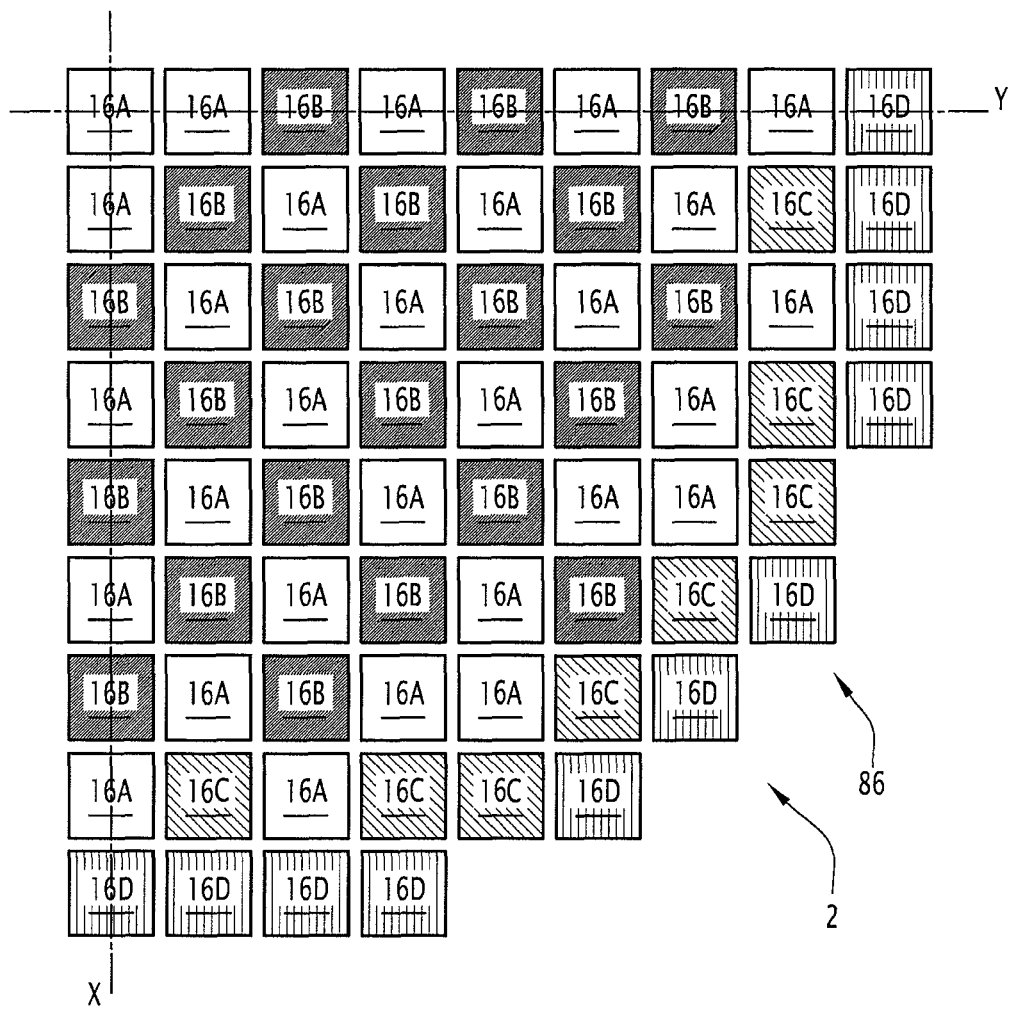
FIGS. 8 to 12 are schematic partial and top views of the core of the reactor of FIG. 1 showing the successive distributions of the nuclear fuel assemblies upon starting the reactor in order to reach a plutonium-equilibrium cycle.

As illustrated by FIG. 8, the assemblies 16D are positioned in the outer peripheral layer of assemblies 86 of the core 2.

The presence of the assemblies 16D in the outer peripheral layer 86 allows limitation of the number of interfaces between the MOX fuel and the $UO_2$ fuel and therefore a limitation of the values reached by the enthalpy rise factor FΔH of the hottest rod of the core 2.

In the replacement step preceding the first transition cycle, are introduced:
for example 24 transition nuclear fuel assemblies 16E which only contain $UO_2$ fuel, possibly with certain rods 24 containing a consumable neutron poison, such as gadolinium oxide, and
for example 56 nuclear fuel assemblies 16F which contain MOX fuel.

The assemblies 16E for example contain uranium enriched to 4.8% by mass of uranium 235.

Although these solutions are less advantageous economically, it is possible to load in place of the assemblies 16E, transition nuclear fuel assemblies only containing MOX fuel with a nominal fissile isotope content t less than that of the assemblies 16F or of the zoned MOX assemblies.

The assemblies 16F are for example assemblies only containing MOX fuel, and for example are identical with the assemblies which will be used in the subsequent plutonium-equilibrium cycles. In the considered example, the nominal fissile isotope content of their MOX fuel is for example 5.4% which corresponds, still in the considered example, to a nominal total plutonium mass content of 7.3%.

It will be observed that in this example, the nominal fissile isotope content t of the nuclear fuel assemblies 16F is greater than that of the central zones 80 of the nuclear fuel assemblies 16D.

In order to load the assemblies 16E and 16F into the core 2 during the replacement step preceding the first transition cycle, nuclear fuel assemblies 16A are unloaded.

Figure 9:
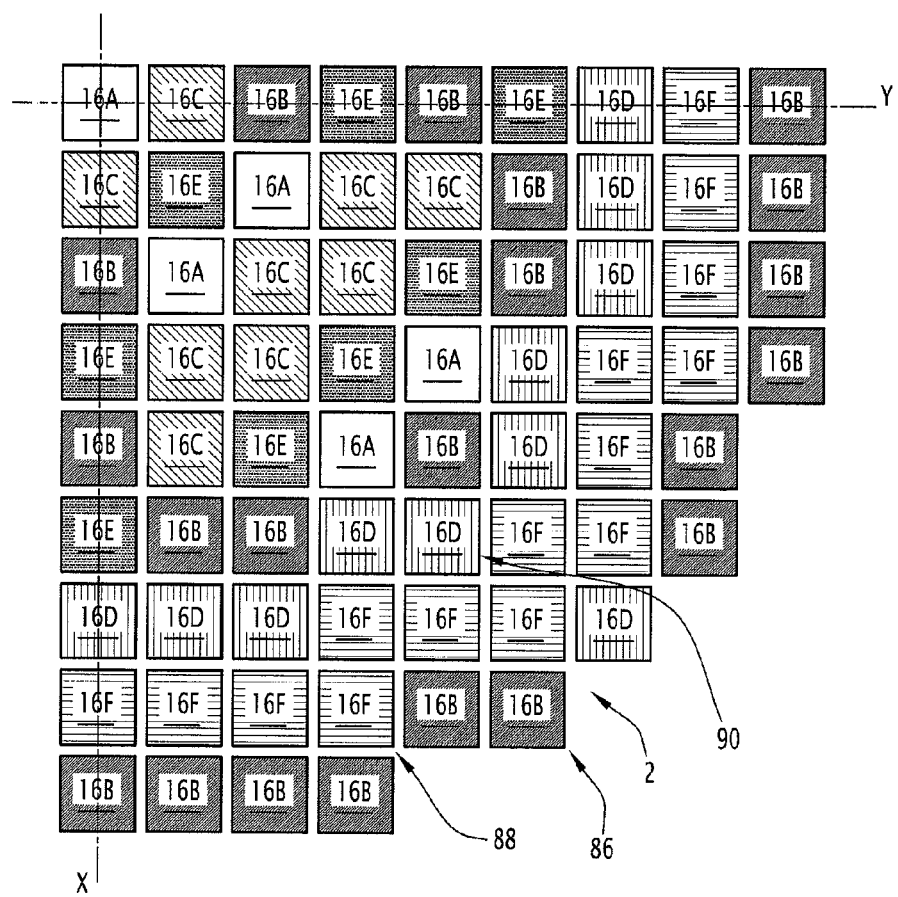
Figure 10:
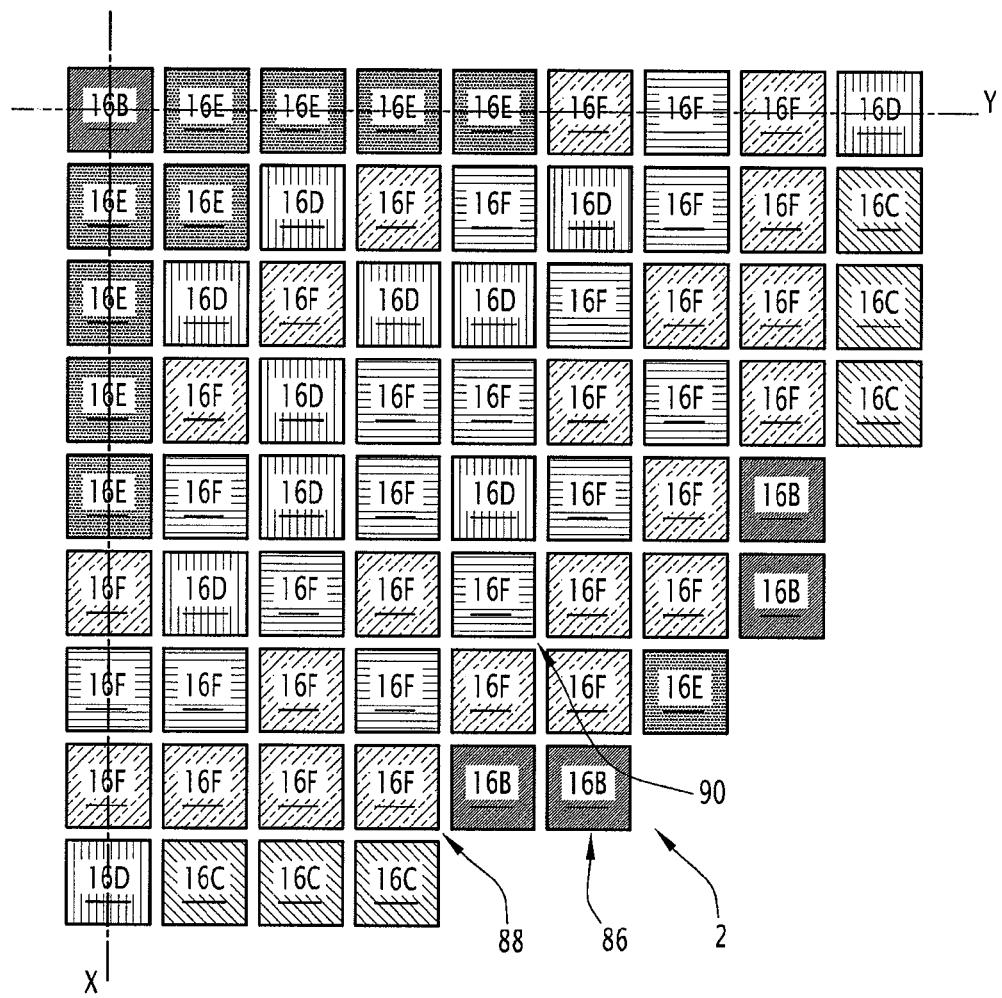
Figure 11:
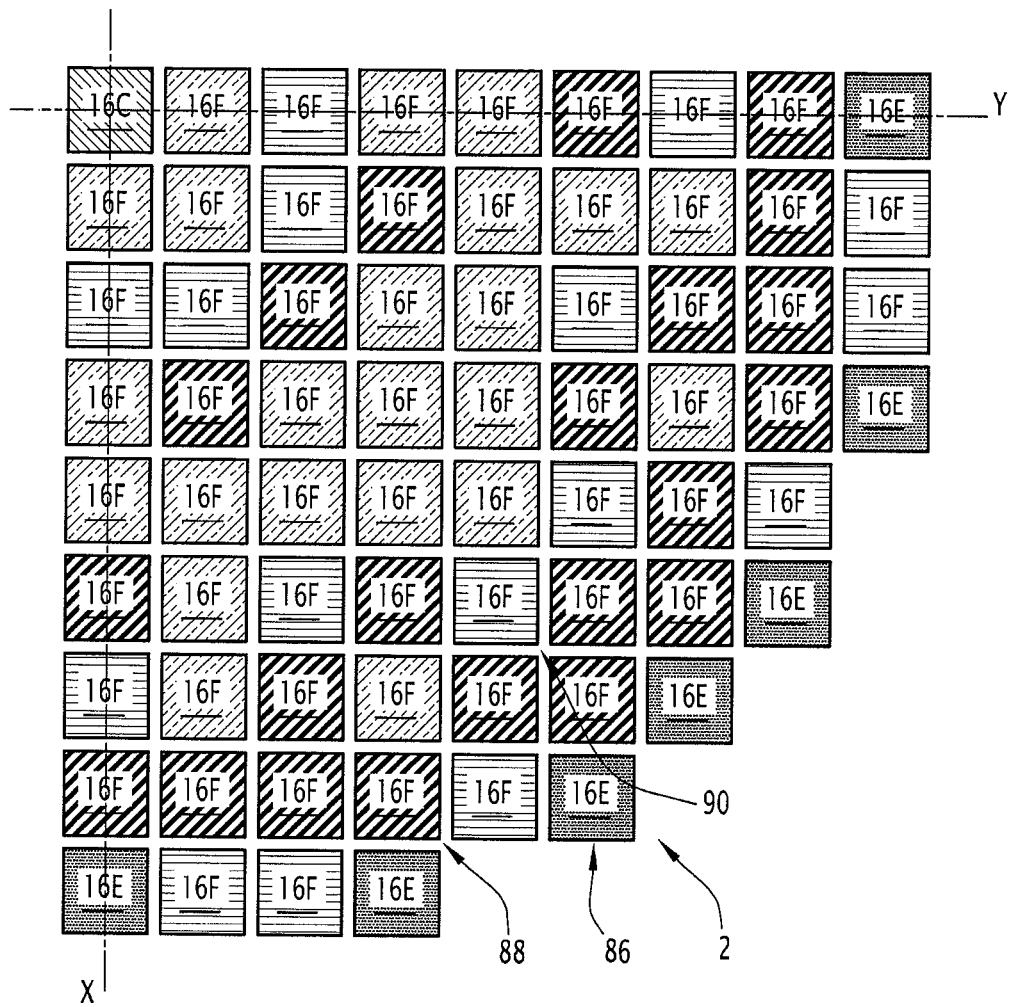
Figure 12:
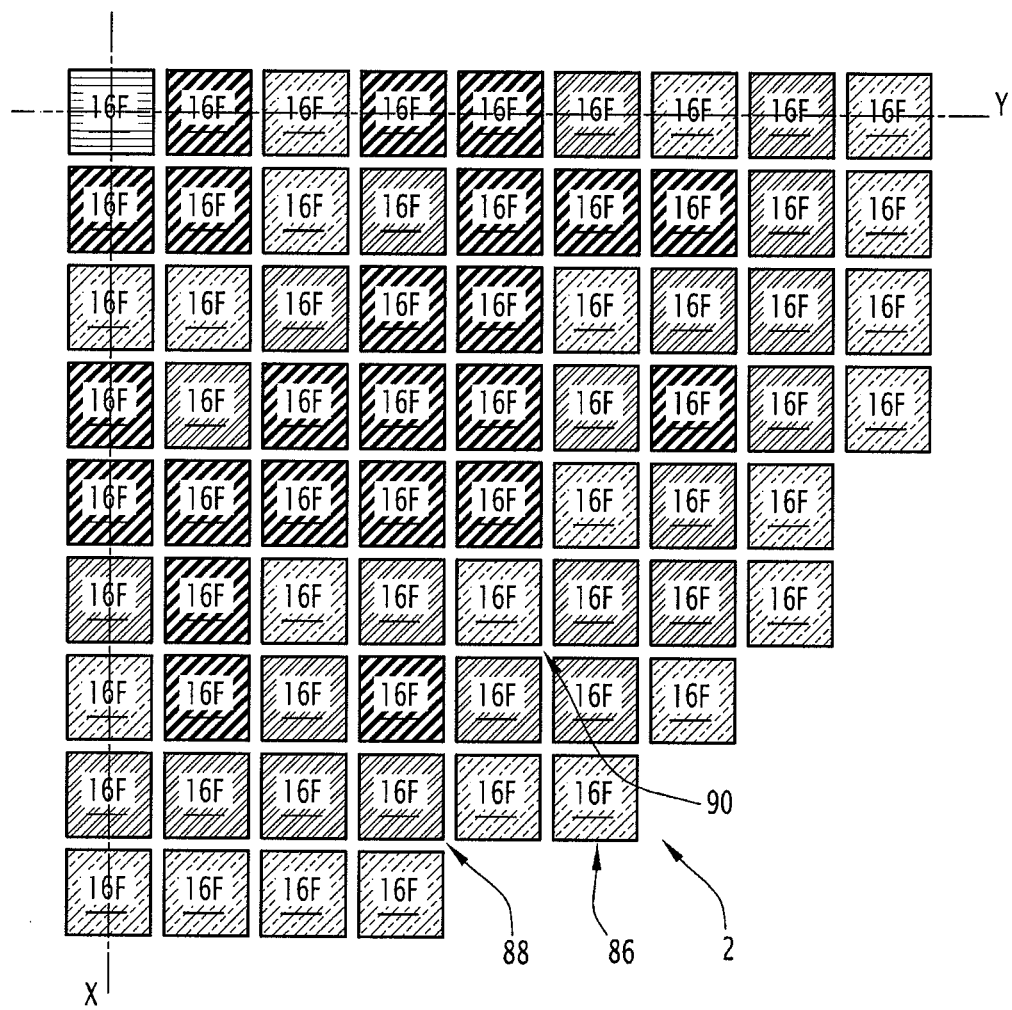

As illustrated by FIG. 9, the assemblies 16F are loaded into the layer of assemblies 88 of the core 2 immediately adjacent to the peripheral layer 86. The assemblies 16D are displaced towards the layer of assemblies 90 of the core 2 immediately located in the inside of the core 2 relatively to the layer 88.

In the replacement steps preceding the second (FIG. 10) and third (FIG. 11) transition cycles and the equilibrium cycle (FIG. 12), nuclear fuel assemblies 16F are loaded in order to progressively replace the nuclear fuel assemblies 16A to 16D. These assemblies 16F are respectively marked by mixed oblique hatchings, wide oblique hatchings and double oblique hatchings depending on the replacement step during which they were introduced.

Thus, during the plutonium-equilibrium cycle (FIG. 12), the core is entirely loaded with assemblies 16F, i.e. plutonium-equilibrium assemblies.

With the method described earlier, it is possible to start the reactor 1 and to reach an equilibrium cycle with a core 100% loaded with MOX assemblies and this with reduced costs as compared with the direct starting of a core 100% loaded with MOX assemblies. Indeed, this allows reduction in the number of MOX assemblies unloaded during the transition cycles without having been subject to complete depletion, assemblies, the cost of which is substantially higher than that of the $UO_2$ assemblies.

This method was only described as an example and many aspects may change from one alternative of this method to another, in particular as regards the nuclear fuel assemblies which may be introduced during the replacement steps. In particular, nuclear fuel assemblies other than those described earlier may be used.

As an example, in the initial cycle, the core 2 may only be loaded with $UO_2$ nuclear fuel assemblies. It is then possible for example by using nuclear fuel assemblies 16D, 16E and 16F to attain an equilibrium cycle with a core 100% loaded with MOX assemblies.

Figure 14:
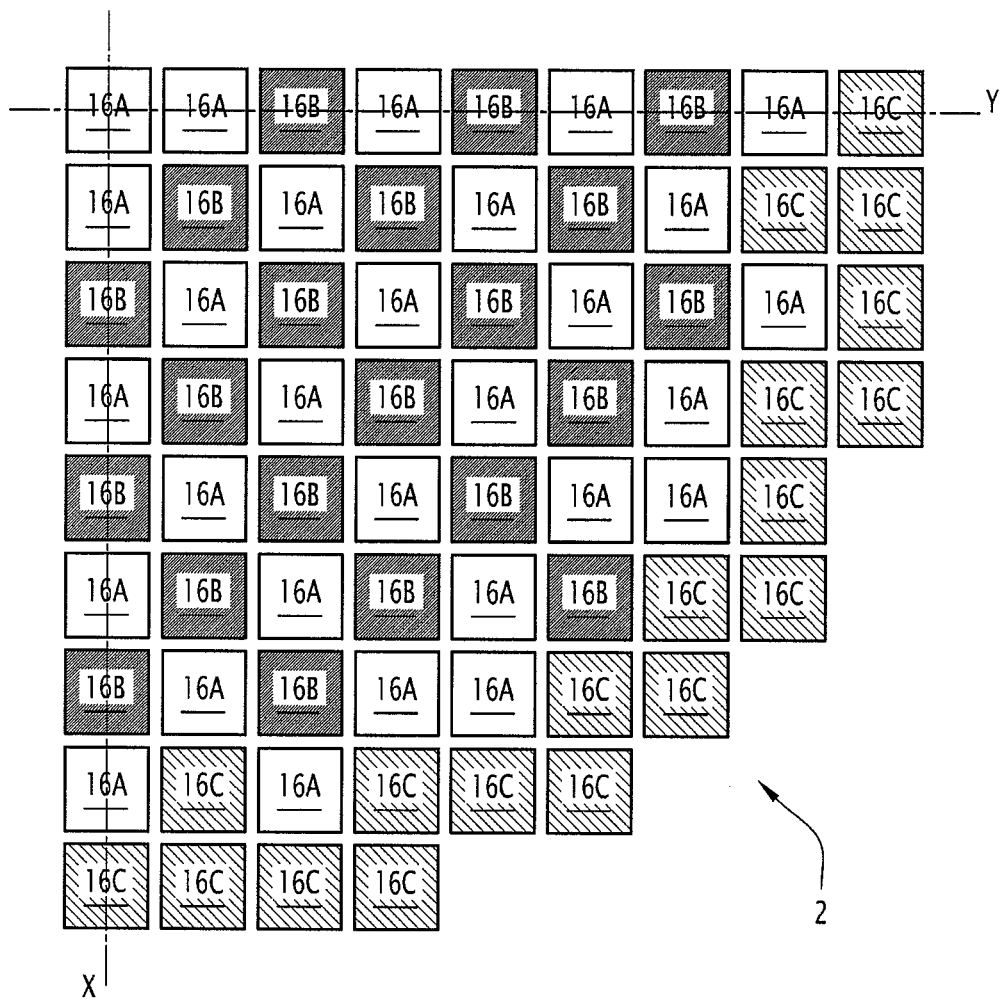
FIG. 14 is a similar view to FIG. 8 illustrating another initial cycle with which a plutonium-equilibrium cycle may be reached.

FIG. 14 illustrates such an initial cycle where the core is loaded with initial assemblies, 16A, 16B and 16C such as those described earlier with reference to FIG. 8. Unlike the case of FIG. 8, the number of assemblies 16C is 72.

The rise to equilibrium with 100% MOX may be achieved in a similar way to what was described earlier with, before a first transition cycle, the replacement of most of the nuclear fuel assemblies 16A and of a few nuclear fuel assemblies 16B with nuclear fuel assemblies 16D in order to obtain a core 2 similar to that of FIG. 8 with optionally adapted respective localizations of the assemblies in the core and contents and enrichments. The continuation of the rise to equilibrium with 100% MOX is achieved in a similar way to what was described earlier with, if necessary, adjustments of the number and of the positions of the assemblies in the core and adjustments of the enrichments and contents.

It may also be desirable to pass from an operation of the core 2 100% loaded with MOX assemblies, to an operation where the core 2 is 100% loaded with $UO_2$ assemblies or with a mixture of $UO_2$ assemblies and MOX assemblies. For this, advantageously, it is possible to use transition nuclear fuel assemblies 16G as the one illustrated by FIG. 15.

This assembly 16G has a zoned configuration and comprises:
in its central zone 80 nuclear fuel rods 24 only containing before irradiation uranium oxide and no plutonium oxide, i.e. $UO_2$ fuel, and
in its peripheral zone 81 extending along the outer faces 82 of the assembly 16G and in particular in its corners 84, nuclear fuel rods 24 containing before irradiation fuel based on uranium and plutonium mixed oxide, i.e. MOX fuel.

The peripheral zone 81 corresponds to the outer layer of nuclear fuel rods 24.

Typically, the nuclear fuel rods 24 of the peripheral zone 81 have a nominal fissile isotope content t less than that of the plutonium-equilibrium nuclear fuel assemblies 16 present in the core 2 before the transition, for example the assemblies 16F.

In certain alternatives, the central zone 80 may contain rods 24 containing before irradiation a consumable neutron poison.

Figure 16:
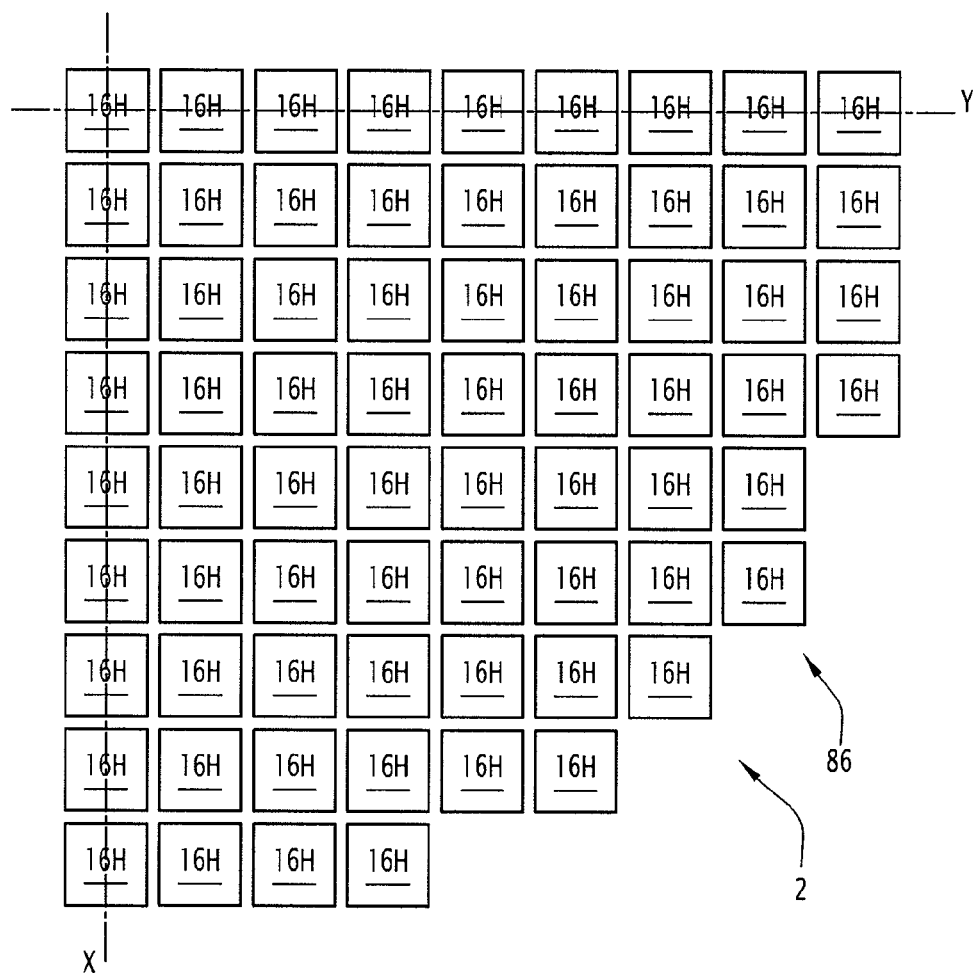
FIG. 16 is a similar view to FIGS. 8 to 14 illustrating a uranium-equilibrium cycle.

A method for operating the nuclear reactor will thus be described in the following, giving the possibility of passing from a plutonium-equilibrium cycle, in which the core 2 is for example 100% loaded with MOX nuclear fuel assemblies such as the assemblies 16F described earlier, to a uranium-equilibrium cycle, in which the core 2 is, as an example, 100% loaded with $UO_2$ assemblies 16H (FIG. 16).

In a replacement step preceding a first transition cycle, plutonium-equilibrium MOX assemblies 16F are removed and for example 81 transition nuclear fuel assemblies 16G are introduced. The rods 24 of the central zone 80 of the assemblies 16G may have an enrichment of 4.0% by mass of uranium 235 and some rods 24 of the zone may contain a consumable neutron poison, for example gadolinium oxide generally with a uranium 235 enrichment of the supporting uranium oxide less than that of the non-poisoned rods 24, for example an enrichment of 2% by mass. The uranium 235 enrichment of the rods of the central zone 80 is generally different and lower than that of the rods of the assemblies 16H. The rods of the peripheral zone 81 preferably have a nominal total plutonium mass content of less than half of that of the plutonium-equilibrium MOX assemblies 16F.

The transition assemblies 16G are for example introduced into the layer of assemblies 88 immediately adjacent to the outer peripheral layer of assemblies 86 of the core 2, and more at the centre of the core 2, but not in the outer peripheral layer 86.

After having operated the reactor 1 for the first transition cycle, 80 plutonium-equilibrium MOX assemblies 16F are removed.

80 transition nuclear fuel assemblies 16G are then loaded, which are distinguished from those described earlier by the fact that the uranium 235 enrichment of the rods of the central zone 80 is not necessarily identical with that of the preceding assemblies 16G nor with that of the rods 24 of the assemblies 16H. This enrichment may for example be adjusted in order to meet the needs of the operator in particular as regards cycle length. However in order to reach equilibrium more rapidly, the assemblies 16G loaded before the second transition cycle preferably have a uranium 235 enrichment similar to that of the assemblies 16H. These transition assemblies 16G are for example loaded while avoiding the outer peripheral layer of assemblies 86 of the core 2. The reactor 1 is then operated for a second transition cycle.

Next, in the replacement step preceding a third transition cycle, the remaining last plutonium-equilibrium MOX assemblies 16F will be replaced with 80 $UO_2$ assemblies 16H with a uranium 235 enrichment of for example 4.95% by mass. These last assemblies 16H which are uranium-equilibrium nuclear fuel assemblies only contain $UO_2$ rods, some of which possibly contain a consumable neutron poison.

The method will further comprise if necessary two transition cycles in which the residual transition assemblies 16G introduced earlier, are replaced with uranium-equilibrium nuclear fuel assemblies in order to attain a core 2, 100% loaded with $UO_2$ assemblies, with for example a uranium 235 enrichment of 4.95% by mass.

The operating method described earlier for passing from a plutonium-equilibrium cycle to a uranium-equilibrium cycle gives the possibility of ensuring such a transition in an economical way, while limiting the risks of damaging the nuclear fuel assemblies, and in particular the risks of damaging nuclear fuel rods 24 containing MOX fuel.

Figure 17:
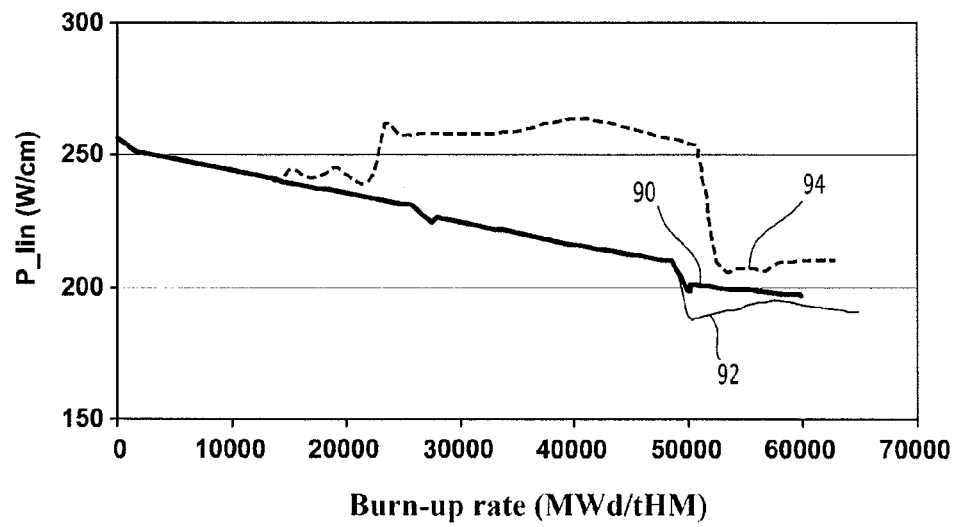
FIGS. 17 and 18 are views comparing the linear power densities attained within nuclear fuel assemblies upon passing from a plutonium-equilibrium cycle to a uranium-equilibrium cycle with or without the use of an assembly according to FIG. 15.

Thus, FIG. 17 illustrates the maximum linear power density as seen by the nuclear fuel rods 24 of the MOX assemblies respectively unloaded in the replacement step preceding the first transition cycle (curve 90), in the replacement step preceding the second transition cycle (curve 92) and in the replacement step preceding the third transition cycle (curve 94).

Figure 15:
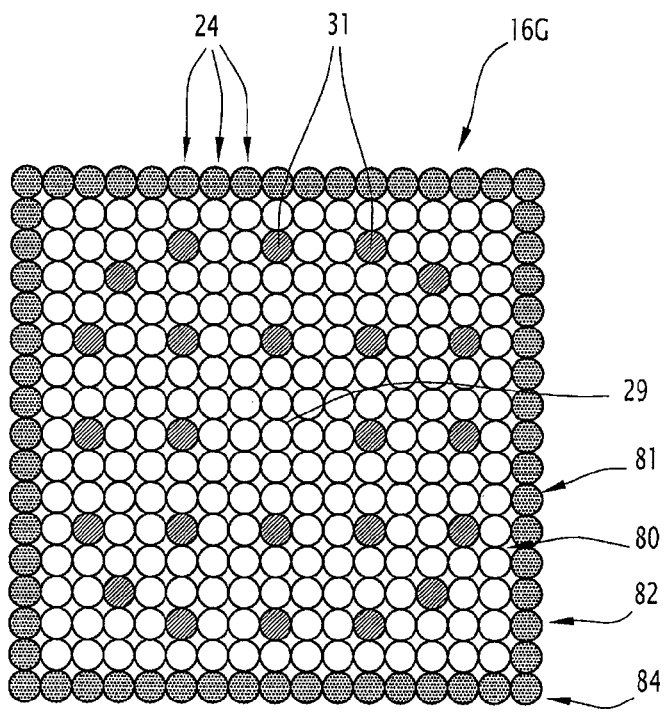
FIG. 15 is a similar view to FIG. 13 illustrating a transition nuclear fuel assembly which may be used upon passing from a plutonium-equilibrium cycle to a uranium-equilibrium cycle.
Figure 18:
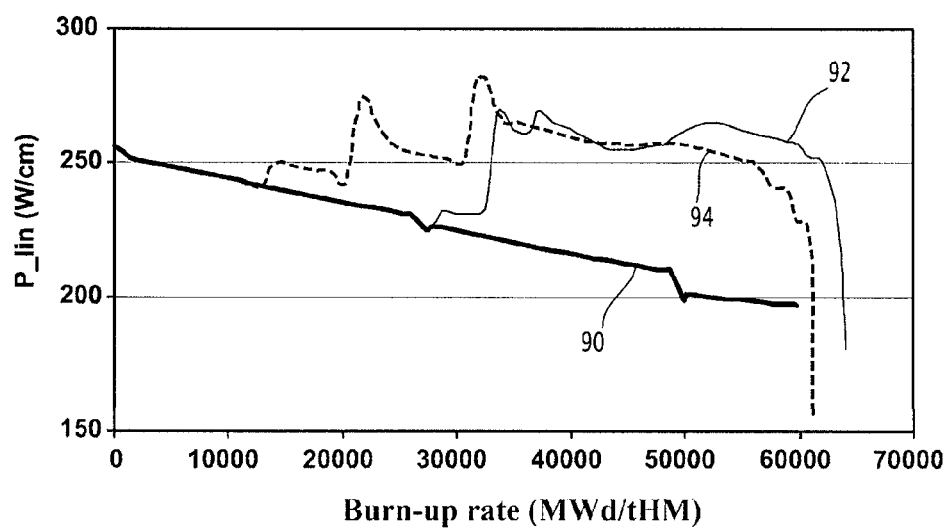

FIG. 18 illustrates the same curves, obtained not by using transition assemblies 16G such as those of FIG. 15, but by simply replacing the MOX assemblies with $UO_2$ assemblies.

It may be seen, in particular for curves 92 and 94, that the lower linear power density values are in particular reached for large burn-up rates, in particular beyond 50 GWd/tHM when transition assemblies 16G are used.

Thus, the release of fission gases out of the pellets at the end of their lifetime is substantially reduced because the linear power densities of the fuel rods 24 are strongly reduced for large burn-up rates. The transition may therefore be ensured safely.

This operating method with which it is possible to pass from a plutonium-equilibrium cycle to a uranium-equilibrium cycle, does not allow per se the use of more plutonium in a reactor, but it is useful for this purpose. Indeed, a nuclear power plant operator may desire, in order to use a core loaded 100% with MOX assemblies and therefore consume more plutonium, to have a solution allowing return to a more conventional operation with $UO_2$ assemblies.

This method was only described as an example and many aspects may vary from one alternative of this method to another.

Thus, transition nuclear fuel assemblies 16G may only be introduced in one replacement step, their central zones 80 may comprise rods 24 containing MOX fuel . . . .

The operating methods described earlier and giving the possibility to pass from a plutonium-equilibrium cycle to a uranium-equilibrium cycle on the one hand, and to reach a plutonium-equilibrium cycle on the other hand may be used independently of each other and independently of the features described above for the reactor 1. They may further be used with plutonium-equilibrium cycles in which the core is not 100% loaded with MOX assemblies and with uranium-equilibrium cycles in which the core 2 is not 100% loaded with $UO_2$ assemblies.

The invention claimed is:

1. A method for operating a pressurized water nuclear reactor comprising a core containing nuclear fuel assemblies comprising nuclear fuel rods, the method comprising:
   operating the nuclear reactor for successive cycles with, between each cycle, steps for replacing spent nuclear fuel assemblies with fresh nuclear fuel assemblies, including:
      operating the nuclear reactor for an initial cycle for starting the nuclear reactor, during which the core contains initial nuclear fuel assemblies, at least some of the initial nuclear fuel assemblies only comprising nuclear fuel rods, before irradiation, containing uranium oxide and not containing any plutonium oxide; then
      operating the nuclear reactor for transition cycles, at least some of the initial nuclear fuel assemblies being progressively replaced during the replacement steps preceding the transition cycles, with transition nuclear fuel assemblies or with plutonium-equilibrium nuclear fuel assemblies, the plutonium-equilibrium nuclear fuel assemblies only comprising, before irradiation, nuclear fuel rods exclusively based on uranium and plutonium mixed oxide, the nuclear fuel rods of each plutonium-equilibrium nuclear fuel assembly having a same nuclear fuel isotope composition and a same nominal total plutonium mass content; and then
      operating the nuclear reactor for at least one plutonium-equilibrium cycle during which the core only contains plutonium-equilibrium nuclear fuel assemblies.

2. The method as recited in claim 1 wherein at least some of the transition nuclear fuel assemblies comprise poisoned nuclear fuel rods, the poisoned nuclear fuel rods containing, before irradiation, at least one consumable neutron poison.

3. The method as recited in claim 2 wherein at least some of the poisoned nuclear fuel rods do not contain, before irradiation, any plutonium.

4. The method as recited in claim 1 wherein the nuclear fuel rods of at least some of the initial nuclear fuel assemblies have, before irradiation, nominal plutonium fissile isotope contents less than those of the nuclear fuel rods of the plutonium-equilibrium nuclear fuel assemblies.

5. The method as recited in claim 1 wherein at least some of the transition nuclear fuel assemblies comprise nuclear fuel rods, before irradiation, containing uranium oxide and not containing any plutonium oxide.

6. The method as recited in claim 1 wherein, at least during the replacement step preceding at least one of the transition cycles or the at least one plutonium-equilibrium cycle, transition nuclear fuel assemblies are replaced with plutonium-equilibrium nuclear fuel assemblies.

7. The method as recited in claim 1 wherein at least some initial nuclear fuel assemblies are zoned nuclear fuel assemblies, the nuclear fuel rods of the zoned nuclear fuel assemblies containing, before irradiation, uranium and plutonium mixed oxide, the zoned nuclear fuel assemblies each comprising several zones in which the nuclear fuel rods have, before irradiation, different nominal plutonium isotope contents.

8. The method as recited in claim 7 wherein at least some of the zoned nuclear fuel assemblies each comprise:
   a first central zone comprising nuclear fuel rods having a first nominal plutonium fissile isotope content; and
   a second zone extending along outer faces of the zoned nuclear fuel assembly and consisting of nuclear fuel rods having a second nominal plutonium fissile isotope content strictly less than the first nominal plutonium fissile isotope content.

9. The method as recited in claim 8 wherein at least some of the zoned nuclear fuel assemblies each further comprise:
   a third zone positioned in corners of the zoned nuclear fuel assembly and consisting of nuclear fuel rods having a third nominal plutonium fissile isotope content strictly less than the second nominal plutonium fissile isotope content.

10. The method as recited in claim 7 wherein, during the initial cycle for starting the nuclear reactor, the zoned nuclear fuel assemblies are located in an outer peripheral layer of the core.

11. The method as recited in claim 10 wherein at least some of the zoned nuclear fuel assemblies each comprise, during the replacement step preceding a first transition cycle, transition nuclear fuel assemblies loaded into the layer immediately adjacent to the outer peripheral layer of the core.

12. The method as recited in claim 11 wherein, during the replacement step preceding the first transition cycle, the zoned nuclear fuel assemblies are displaced immediately inside the layer located immediately inside the outer peripheral layer of the core.

13. The method as recited in claim 10 wherein transition nuclear fuel assemblies loaded during the replacement step preceding a first transition cycle comprise nuclear fuel rods, before irradiation, containing uranium oxide and not containing any plutonium oxide.

14. The method as recited in claim 13 wherein, during the replacement step preceding the first transition cycle, the zoned nuclear fuel assemblies are displaced immediately inside the layer located immediately inside the outer peripheral layer of the core.

15. The method as recited in claim 10 wherein, during the replacement steps preceding the first transition cycle, a second transition cycle, a third transition cycle and the equilibrium cycle, plutonium-equilibrium nuclear fuel assemblies are loaded.

16. The method as recited in claim 1 wherein, in the initial cycle for starting the nuclear reactor, all the nuclear fuel rods of the initial nuclear fuel assemblies, before irradiation, contain uranium oxide but do not contain any plutonium oxide.

17. The method as recited in claim 1 wherein in the plutonium-equilibrium cycle, the nuclear fuel rods of all the plutonium-equilibrium nuclear fuel assemblies have a same nuclear fuel isotope composition and a same nominal total plutonium mass content.

* * * * *